US011200282B1

(12) United States Patent
Devenny et al.

(10) Patent No.: US 11,200,282 B1
(45) Date of Patent: Dec. 14, 2021

(54) INTEGRATED VIEWS OF MULTIPLE DIFFERENT COMPUTER PROGRAM APPLICATIONS WITH ACTION OPTIONS

(71) Applicant: ATLASSIAN PTY LTD, Sydney (AU)

(72) Inventors: Joshua James Devenny, San Francisco, CA (US); Nathaniel Jones, San Francisco, CA (US); Samuel Tardif, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 16/119,197

(22) Filed: Aug. 31, 2018

Related U.S. Application Data

(63) Continuation of application No. 62/646,764, filed on Mar. 22, 2018.

(51) Int. Cl.
| | |
|---|---|
| *G06F 16/9038* | (2019.01) |
| *G06F 16/903* | (2019.01) |
| *G06N 20/00* | (2019.01) |
| *G06F 9/451* | (2018.01) |
| *G06F 9/54* | (2006.01) |
| *G06F 3/0482* | (2013.01) |

(52) U.S. Cl.
CPC ........ *G06F 16/9038* (2019.01); *G06F 3/0482* (2013.01); *G06F 9/451* (2018.02); *G06F 9/542* (2013.01); *G06F 16/90335* (2019.01); *G06N 20/00* (2019.01)

(58) Field of Classification Search
CPC .......... G06F 16/9038; G06F 16/90335; G06F 3/0482; G06F 9/542; G06F 9/451; G06N 20/00
See application file for complete search history.

(56) References Cited

U.S. PATENT DOCUMENTS

| | | | |
|---|---|---|---|
| 6,654,735 B1 | 11/2003 | Eichstaedt et al. | |
| 9,703,841 B1 * | 7/2017 | Hwang | ................. G06F 16/957 |
| 2009/0292980 A1 | 11/2009 | Swineford et al. | |

(Continued)

*Primary Examiner* — John T Repsher, III
(74) *Attorney, Agent, or Firm* — Brown Hyatt Farber Schreck, LLP

(57) ABSTRACT

In an embodiment, a computer-implemented method comprises accessing a plurality of different computer program applications that are associated with a single account and retrieving data items that are associated with the account from each different application among the plurality of applications; identifying a subset of the data items comprising relevant data items, at least a first data item of the subset being associated with a first application of the plurality of applications, and at least a second data item being associated with a second application of the plurality of applications that is different than the first application; causing displaying, using a computer display device, an integrated view comprising at least the first data item and the second data item of the subset of the data items; receiving a first input specifying a first action associated with the first data item, and a second input specifying a second action associated with the second data item; in response to the first input, signaling the first application to perform the first action; in response to the second input, signaling the second application to perform the second action.

15 Claims, 9 Drawing Sheets

(56) References Cited

U.S. PATENT DOCUMENTS

| | | | |
|---|---|---|---|
| 2010/0257143 A1* | 10/2010 | Sosnosky | G06F 11/1448 |
| | | | 707/682 |
| 2012/0131020 A1 | 5/2012 | Nitz et al. | |
| 2013/0036117 A1* | 2/2013 | Fisher | G06F 16/487 |
| | | | 707/736 |
| 2016/0005005 A1* | 1/2016 | Dhara | H04L 65/403 |
| | | | 705/7.19 |
| 2016/0127452 A1* | 5/2016 | Newman | G06F 16/182 |
| | | | 709/203 |
| 2016/0154549 A1* | 6/2016 | Chaudhri | H04L 51/24 |
| | | | 715/825 |
| 2016/0239547 A1* | 8/2016 | Lim | G06F 3/04842 |
| 2017/0329614 A1* | 11/2017 | Schon | G06F 3/04845 |
| 2018/0077097 A1* | 3/2018 | Alfaro | H04L 51/12 |
| 2018/0091456 A1* | 3/2018 | Weinberg | H04L 51/14 |
| 2018/0199156 A1* | 7/2018 | Gandhi | H04W 4/06 |
| 2018/0300324 A1* | 10/2018 | Ziraknejad | G06F 15/76 |
| 2019/0005458 A1* | 1/2019 | Mallipudi | G06Q 10/1093 |
| 2020/0089381 A1* | 3/2020 | Ji | G06F 3/0487 |

* cited by examiner

INTEGRATED VIEWS OF MULTIPLE DIFFERENT COMPUTER PROGRAM APPLICATIONS WITH ACTION OPTIONS

BENEFIT CLAIM

This application claims the benefit under 35 U.S.C. § 119(e) of provisional application 62/646,764, filed Mar. 22, 2018, the entire contents of which are hereby incorporated by reference for all purposes as if fully set forth herein.

TECHNICAL FIELD

One technical field of the present disclosure is computer-implemented decision support systems and display systems. Another technical field is federated systems of multiple computer program applications. The disclosure generally relates to improved methods, computer software or computer hardware in the field of productivity application programs. The disclosure relates more specifically to improved computer-implemented methods for integrating views of multiple applications and providing action options.

BACKGROUND

The approaches described in this section could be pursued but are not necessarily approaches that have been previously conceived or pursued. Therefore, unless otherwise indicated herein, the approaches described in this section are not prior art to the claims in this application and are not admitted to be prior art by inclusion in this section.

With the advent of cloud computing platforms, more businesses are deploying and hosting applications and/or services on servers and storage modules maintained by cloud computing platforms. This affords flexibility, as organizations can dynamically increase/decrease storage and/or processing requirements based on utilization, and potentially cost savings as organizations do not have to maintain or service the underlying hardware resources.

Cloud computing applications such as word processing applications, spreadsheet applications, accounting applications, and the like have become more widely available. Despite these increased offerings, each cloud application is still treated as though it is a stand-alone, off the shelf, software application. Consequently, significant problems with inefficient data transfer, data updating, and user interaction exist, which collectively result in unnecessary use of CPU cycles, memory and storage resources. Improvements are needed in cloud applications to improve the efficiency of use of these resources and to reduce the number of messages, transactions and data transfers that are required to update different applications.

SUMMARY

The appended claims may serve as a summary of the invention.

DESCRIPTION OF EXAMPLE EMBODIMENTS

Figure 1:
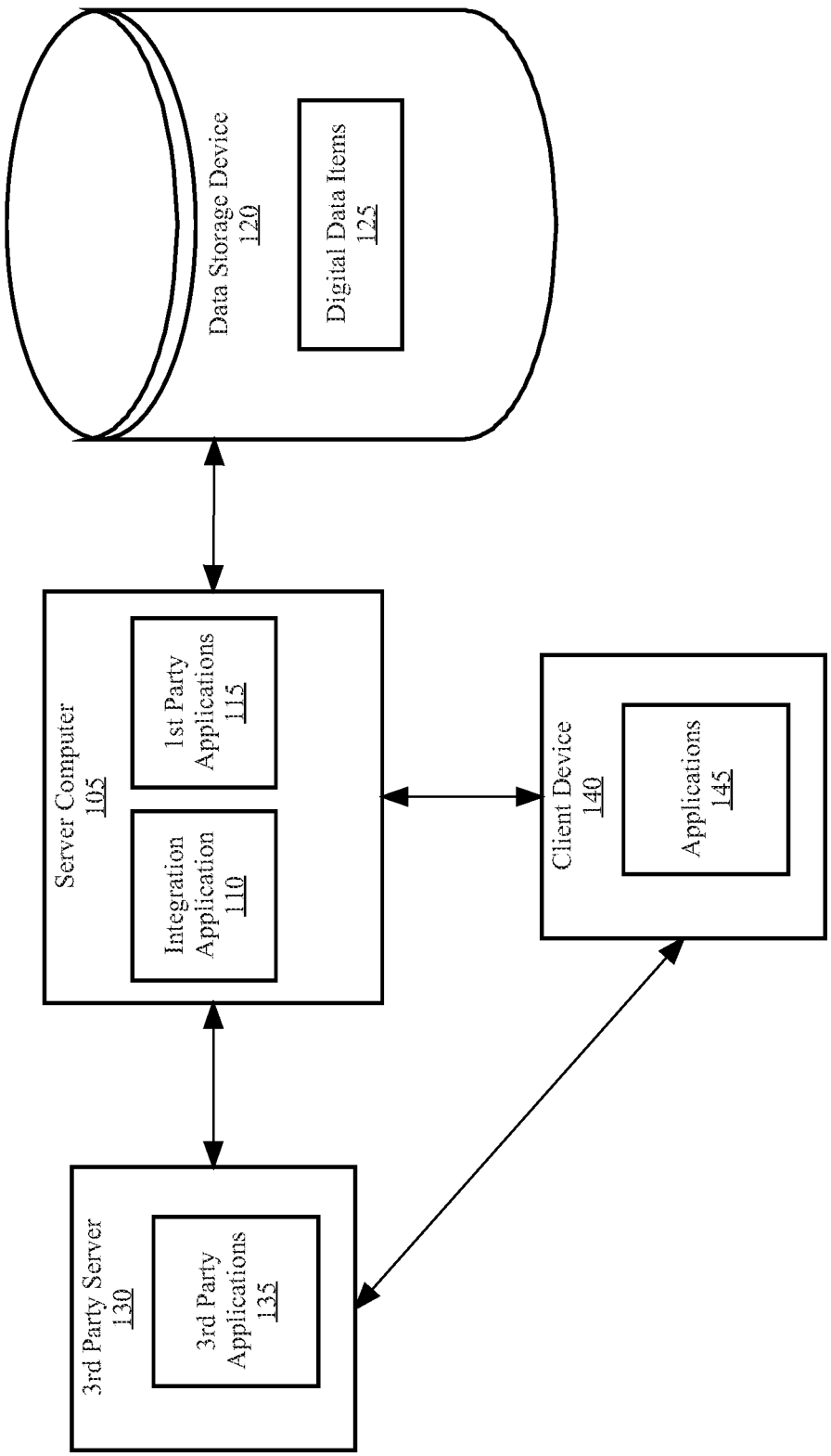
FIG. 1 illustrates a computer system in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION
   3.1 INTEGRATING VIEWS OF MULTIPLE APPLICATIONS AND PROVIDING ACTION OPTIONS
   3.2 WORK FEED OF MULTIPLE APPLICATIONS WITH OBJECT BASED GROUPING
   3.3 SUGGESTIONS USING DATA FROM MULTIPLE APPLICATIONS
4. IMPLEMENTATION EXAMPLES
   4.1 INTEGRATING VIEWS OF MULTIPLE APPLICATIONS AND PROVIDING ACTION OPTIONS
   4.2 WORK FEED OF MULTIPLE APPLICATIONS WITH OBJECT BASED GROUPING
   4.3 SUGGESTIONS USING DATA FROM MULTIPLE APPLICATIONS
5. IMPLEMENTATION EXAMPLE—HARDWARE OVERVIEW
6. EXTENSIONS AND ALTERNATIVES

1. Overview

The inventors have realized that cloud computing and cloud-based distribution or access of applications is experiencing a tremendous explosion of growth. The type, quality, and quantity of cloud-based applications is increasing at an astronomical rate. This is having profound effects on how enterprises and other users select and use software. Since consumers who utilize a cloud application do not have to manage or own their own hardware and have little to nothing to install to access a cloud application, consumers are no longer "locked in" to a particular software application or a particular software company. Now, many consumers select specific software applications from many different companies because each piece of software is "the best" at exactly what the consumer needs.

However, this freedom has come at a cost. When many different software applications are used from multiple different developers or companies, there is little to no efficiency in data transfers between the software applications or in updating consumer data. Computer interaction with multiple different computer program applications may require different data entry operations, data transfers, network messages or consumption of other resources. For example, if a coworker needs to complete a task in a first application before a subsequent step may be performed by another worker in a second application, then the coworker may be unaware if an automated notification system is not in place. This can be a larger issue if the first application is infrequently used and/or the other worker forgets to log in to the first application and check if the coworker has completed their task.

Additionally, when consumer data is disjointed, and work is performed in multiple different applications, individual workers may have difficulty identifying what work to perform next or knowing what their coworkers are doing. Further still, may be difficult for an individual worker to determine what the best use of his or her time may be. Embodiments may provide a single location or application that is individualized and able to provide views into data residing at multiple different locations or applications at the same time, while simultaneously highlighting or emphasizing the most relevant and important work for a specific user or individual. Further, based on data presented in the multiple views, the user or individual can take substantive application actions from the single location or application that cause those actions to be performed within the application from which the data originated.

In various embodiments, computer-implemented techniques are provided for integrating views of multiple applications and providing action options. In one embodiment, as a preparatory step, an account is created with a provider of an integration application. The account is specific to a particular individual user, client or computer, and is used to access the integration application. The integration application may be accessed from any of several different devices, such as a smartphone, a home laptop, or a work desktop computer. The account is associated with data specifying applications from which the integration application should gather data. The data may be created by providing a username or password for access to the other applications, a website or other location to screen scrape data, or any information needed to access data via an application programming interface (API)

The integration application may obtain data from one or more other applications, programs or systems at any time and in any manner. For example, the data may be sent to the integration application from other applications without needing specific requests. Once obtained, the data may be processed using one or more classifiers, regression engines or other machine learning algorithms, may be modified by applying account preferences or settings, or may be filtered.

Relevant data items are identified during processing and may be presented on the client device. Depending on the view that is presented, a data item may or may not be relevant. For example, if the view is for only work that can be completed in forty-five minutes or less, then data item A (which takes thirty minutes to complete) is possibly relevant. However, if the view is for only work that can be completed in five minutes or less, than data item A is not relevant.

Once relevant data items are presented, actions may be executed based on those presented data items, from the integration application, and the actions will be performed in their associated applications. The integration application may send any instructions or other data to the other applications as needed to cause the desired actions to be performed. Subsequently, the view or views are updated to reflect the performance of the action within the other application.

Embodiments are described that provide significant improvements to computer technologies including productivity applications, federating computer systems and applications, and other computer technologies. These techniques offer reduced use of network bandwidth, CPU cycles, storage and memory because of the efficiency of the messages, decisions and algorithms that are disclosed. Other aspects, features and embodiments will become apparent from the disclosure as a whole.

2. Example System Implementation

FIG. 1 illustrates an example computer system in which the techniques described may be practiced, according to some embodiments.

In one embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 includes server computer 105, integration application 110, first party applications 115, data storage device 120, digital data items 125, third party server 130, third party applications 135, client device 140, and applications 145. In one embodiment, server computer 105 may be a multitenant service provider computer owned by, operated by, or associated with an application service provider that provides an online, real-time application program based upon software as a service (SaaS) environment that is used by or accessible to multiple tenants, and accessed using client computers coupled over one or more networks to server computer 105. In one embodiment, server computer 105 may be part of a public or private cloud or other virtual computing facility and allows an entity to execute applications on server computer 105.

Alternatively, server computer 105 may be any computing device, and may be owned or operated on the behalf of a single entity, such as a behind the firewall server for a business. Server computer 105 is communicatively connected to data storage device 120 and client device 140 using any suitable wired or wireless connection, including, but not limited to: a Local Area Network (LAN), a Wide Area Network (WAN), the Internet, or a company network. Server computer 105 executes integration application 110 and/or first party application 115. Additionally, server computer may execute other applications (not shown) in addition to integration application 110 and first party applications 115.

In one embodiment, data storage device 120 may be any suitable storage device such as one or more hard disk drives, memories, or any other electronic digital data recording device configured to store data. Although data storage device 120 is depicted as a single device in FIG. 1, data storage device 120 may span multiple devices located in one or more physical locations. For example, data storage device 120 may be one or more nodes of one or more data warehouse(s). Additionally, in one embodiment, data storage device 120 may be located on the same device(s) as server computer 105. Alternatively, data storage device 115 may be located on a separate device(s) from server computer 105. Additionally, data storage devices may be located on each client device associated with a computing system, such as an enterprise or work computing system. Any combination of the above may be used.

Data storage device 120 may include one or more databases implemented using any suitable methodology, such as a relational database or a columnar database. The database may be of any size, portioned into any number of rows, columns, or tables, and may be organized in any manner. In a multitenant embodiment, data stored on data storage device 120 may relate to any number of different tenants, such as hundreds to thousands of tenants or more depending on resource capacity and throughput. The data stored on data storage device 120 may relate to any type of data, such as chat or messaging application data, calendar application data, productivity application data, email application data, personal information, business information, governmental data, health data, environmental data, or police or military data. Individual data records may have any number of fields, components, or other aspects. In other words, any type or amount of data may be stored in data storage device 120 in any format.

In one embodiment, data storage device 120 stores digital data items 125. Digital data items 125 may be any item or items of digital data. For example, digital data item 125 may be any item or items of digital data including, but not limited to: a programmatic object, a database record, Universal Resource Locators (URLs), a website, emails, chat logs, a text or short message service (SMS) message, an audio recording, a video recording, a transcript, a text document, a spreadsheet, source code, a slideshow, pictures or other images, electronic data file(s) or metadata Any number of digital data items 125 may be stored by data storage device 115. Digital data item 125 may be a copy of digital data, an original of digital data, or may be a link to a location where a particular digital data item 125 may be accessed or is stored. A particular digital data item 125 may be associated with a particular application or applications that creates, manages, or uses the particular digital data item 125. Particular digital data items 125 may also be associated with one or more of: a particular user or individual, team or group of users, or business In one embodiment, third party server 130 may be any device or devices as discussed above with regards to server computer 105. In particular, third party server 130 is not owned by or controlled by the entity that owns or controls server computer 105. For example, if "Company A" developed integration application 110 and first party applications 115, then "Company A" would not own or control third party server 130. Rather, "Company B" may own or control third party server 130. third party server 130 may store digital data items (not shown) in a data storage device (not shown) in any of the manners described above with respect to data storage device 120 and/or digital data items 125. third party server 130 may be part of a public or private cloud or other virtual computing facility.

Likewise, in one embodiment, third party applications 135 are applications developed by an entity different than the entity that developed integration application 110 and first party applications 115. third party applications 135 may be any type of application including, but not limited to: productivity applications, calendaring applications, messaging applications, email applications, spreadsheet applications, word processing applications, business applications, customer relationship management applications, finance applications, multimedia applications, networking applications, or social media applications third party applications 135 may generate and/or use digital data items, and may allow integration application 110 access to any digital data items generated or used by third party applications 135. Third party applications 135 may include an API that allows programmatic access to application data or may make associated digital data items available in any other suitable way. Particularly, third party applications 135 may be cloud based applications used by many different entities.

Returning to server computer 105, in one embodiment, server computer 105 executes integration application 110. Although depicted in FIG. 1 as a single standalone application, event application 110 may be one or more applications, plugins, and/or modules that execute on one or more computing devices. Integration application 110 is programmed or configured to integrate views of multiple applications and provide action options, provide a work feed of multiple applications with object-based grouping, and provide suggestions using data from multiple applications. Further, integration application 110 is programmed or configured to provide the functionalities described herein, as well as any other or additional functionality as needed to perform the methods, features, and aspects described herein.

Integration application 110 is programmed or configured to create and manage accounts. Integration application 110 may utilize a module, API, other application, or any other method to create and manage accounts. Any number of accounts may be created and used, such as one per user. Each account is intended to be for a single user or individual, so that account specific (i.e., user specific) data may be presented. An account may include any information needed by the methods described herein, including but not limited to: username, password, business, name, age, other applications to gather data from, access credentials to other applications, organizational membership, team membership, profile data, or pictures. The accounts may be created, accessed, and managed in any suitable manner or format.

Integration application 110 is programmed or configured to gather data from applications. The data gathered may be of any type, in any format, and may be gathered or updated at any frequency. For example, data may be gathered or checked continuously, on change, at predetermined times or intervals, or some combination thereof. Further, the data may be gathered using different frequencies or timings and/or different methods depending on the application associated with the data. For example, data associated with "Application A" may be data that changes infrequently, and is checked twice a day for updates, while data associated with "Application B" may be of high importance and checked every 10 minutes for changes. The data gathered should be sufficiently complete to, after processing, provide a particular individual with a complete view(s) into his or her work day, week or month, and assist with maximizing the use of his or her time. Thus, the data gathered may include, but is not limited to: files, objects, metadata, changes to documents or files, links, multimedia data, or messages. Additionally, integration application 110 gathers data for many different accounts. For example, if an entire team or company uses integration application 110, then data for each account within the team or company will be gathered and may subsequently be used to identify relevant data items, as discussed below.

Integration application 110 is programmed or configured to process data gathered from applications and identify relevant data items. The results of processing gathered data is account specific, and thus provides the user or viewer of the account with information that is specific to that account. However, the data that is processed may be related to any number of different accounts. For example, if coworkers of an account are able to be identified, then data gathered or related to those coworker accounts may be relevant to a current or target account. Likewise, data relating to employees on a same team or project, within a same business unit, or within a same company, may provide insights into what data is most relevant to the current account. Optionally, some data may be aggregated for easier processing. Alternatively, or in addition, some gathered may not be aggregated. Processing of gathered data may involve any number of different steps, methods, or algorithms. For example, processing may involve comparing or correlating calendar events, such as a meeting, and documents generated before, after, or during the meeting, or identifying documents that reference the meeting or the subject matter of the meeting. The processing may involve various machine learning algorithms, and may leverage aggregated data, both historical and current. For example, data from a particular grouping of accounts or users may be aggregated to determine patterns or other ways of identifying relevant data items. For example, data related to a particular application, a particular company, a particular team, or a particular office, may be aggregated to assist in identifying relevant data items. More than one set or sets of relevant data items may be identified, depending on the context of the view or views. For example, depending on the view(s) selected or presented, different data items may be relevant to a view about work to be done today vs work that was performed last week. Likewise, if one view highlights work for a first project while a second view highlights work for a second project, different data items may be relevant.

Any number of data items may be identified as relevant to the particular account or user. The relevancy of a particular data item may be numerically scored or otherwise graded, so that data items may be ranked or ordered, and the most relevant ones subsequently presented. Alternatively, the relevancy of data items may be identified, measured, or scored in any manner. The rating or relevancy of data items may change over time and may be updated or changed at any time.

Integration application 110 is programmed or configured to present relevant data items from multiple applications in one or more views. Any number of views may be presented on one or more screens. For example, one view may be "quick tasks" that may be completed in less than 30 minutes, or however much time a user has in their calendar before their next meeting. Another view may be "deep focus" that shows tasks that are expected to take longer and may be seen when a user has an hour or more in a block free in their schedule. Still another view may highlight updates to documents or actions that flowed from meetings earlier in the day, a notification stream view, views for particular teams, or views for particular projects. Regardless of the view or views displayed, each view is individualized for the particular account associated with the view. Thus, even if two accounts are associated with the same team and went to the same meeting, the views presented about that meeting may be different (for example, because one account is for a manager while another is account for an assistant).

The views may be presented in any format and in any configuration. Additional features may be displayed alongside a description of the data item. For example, when highlighting changes made to a document after a meeting, the name of the document may be displayed, along with an icon for the application associated with the document. Clicking the name or the icon may open the document in the associated application and may automatically show or highlight the section(s) where changes were made, or the changes themselves. Further, any other data may also be shown, such as who made the changes, such as by showing a small picture of the user who made the changes. Additionally, an action button may be displayed near the data item. In some views, a single action button may be presented that causes a most relevant action to be performed within the associated application, as discussed below.

Integration application 110 is programmed or configured to receive input related to presented data items. The input may be received in any manner and in any format. For example, the input may indicate that the data item has been viewed and should be removed from the view. Alternatively, the input may indicate that an action should be performed, such as posting a comment or making a change to a document, as discussed below.

Integration application 110 is programmed or configured to cause actions to be performed within applications related to data items based on received input. For a user, these actions may be performed without leaving integration application 110 or the current view and may even be performed by simply clicking a button next to a presented data item, for example. However, the actions are performed by the application associated with the data item, and the actual data item is updated as needed. For example, if the application associated with a data item is a productivity application that creates and manages Wiki pages, and the action was to post a comment on the particular Wiki page that was highlighted in a view, then the comment would be added to the particular Wiki page as though the user were using the productivity application.

Integration application 110 is programmed or configured to update one or more presented views. The updated views reflect any changes made to the data items, such as by one or more actions of the user of the account or actions of other accounts. Integration application 110 is programmed or configured to send notifications. Notifications may be sent in any suitable manner or format, such as an email message or a chat message. Notification may be sent to any recipient for any reason.

Integration application 110 is programmed or configured to receive notifications from other applications. The notifications may be received in any format at any time. Optionally, integration application 110 may gather notification data from other applications rather than, or in addition to, receiving notification data. The notification data may be recent actions performed within the associated other applications, such as updates, comments, mentions, posts, links, or shares. The notification data may include a time and date, an associated object, the action performed, or any other data as needed.

Integration application 110 is programmed or configured to determine the object associated with a notification and group notifications together based on their associated object. The object may be anything, such as a particular user account, a particular digital data file, a document, a webpage, or a folder. The object associated with a notification may be determined by processing the notification in any manner, or the notification may itself identify the associated object. The notifications may be grouped in any suitable manner. Any number of notifications may be grouped together. As part of the grouping processing, a counter may be incremented, for tracking the number of notifications associated with a particular object. Optionally, notifications may be removed from a group based on age, whether or not the notification has been presented or viewed or based on any other factor.

Integration application 110 is programmed or configured to generate and display a work feed. A work feed is a feed of the most recent activity related to a particular account. The feed may include actions directly related to the account, such as when a folder is shared with the account, or when the account is mentioned or tagged. Alternatively, or in addition, the feed may include actions performed on digital data items the user is following or working on, actions related to organizations or teams the user is in, or any other items that may be of interest to the particular account. The work feed is updated in real time and may be ranked or ordered based on any suitable factors. Typically, the work feed is ordered based on time, with the most recent events being presented at the top of the feed. However, relevancy may also be factored into the ranking or ordering of the work feed, in any suitable manner. For groups of notifications, the group may be displayed or ranked at a location based on the most recent notification of the group. Alternatively, a group may be ranked or ordered based on any other suitable factors.

Integration application 110 is programmed or configured to confirm or get approval from one or more user accounts before gathering certain digital data items, or otherwise allow for varying degrees of privacy and data collection. Privacy settings may be configured in any manner by any suitable entity and may reflect security or other data access concerns.

Integration application 110 is programmed or configured to make suggestions based on gathered data. The suggestions may be determined based on the processing of the gathered data discussed above, and may utilize any number of machine learning algorithms, or other methods. For example, the suggestions may be about what work should be done, such as "Project X is due tomorrow, you should block some time on your calendar to work on it this afternoon—1 pm to 3 pm is free." As another example, the suggestions may be about things coworkers have done or are doing, "John added a new document to the project, consider setting up a meeting with him to discuss." As still another example, the suggestions may be "Team B is doing similar work to what your Team A is currently doing, you should sync up with them to prevent reinventing the wheel." In particular, the suggestions may be based on both calendar data and work data, from one or more accounts.

Integration application 110 is programmed or configured to present gathered data based on other factors than relevancy. For example, each account may include a profile or other viewable wiki type page. In the profile recent activity of the account may be shown. The activity may be organized by data object, may include links directly to the associated applications, may include references to other users or accounts that are working or have worked on the data item, or any other collected data. The profile of the account may be viewable by other accounts, such as by other members of an organization or team. By presenting recent work items by account, other accounts may find work that is being performed around them through the profiles of their coworkers, for example.

Integration application 110 is programmed or configured to classify data and notifications of other applications. The classification may be based on an "element" that best represents what the data or notification is. Example elements include, but are not limited to: actions, decisions, comments, highlight, date, annotate, status, attach, karma, reactions/ emoji, star, watch, remind, tag, link, and share. The above example elements may be grouped into broader categories, such as capture, express, and connect. The capture category may include actions, decisions, comment, highlight, and date. The express category may include annotate, status, attach, karma, and reactions/emoji. The connect category may include remind, watch, star, tag, link, share, and mention. Each element may be given a consistent look or icon within integration application 110. Thus, even though different kinds of information is presented from multiple different applications, the presented information will have a consistent look and will be easier for users to determine what is happening across the many different applications used during the work day. Integration application 110 may classify the data and notifications of other applications in any manner or method.

In one embodiment, server computer 105 executes first party application 115. first party application 115 is any application that is developed or managed by the same entity that developed integration application 110. first party application 115 may be any type of application including, but not limited to: productivity applications, calendaring applications, messaging applications, email applications, spreadsheet applications, word processing applications, business applications, customer relationship management applications, finance applications, multimedia applications, networking applications, or social media applications first party applications 115 may generate and/or use digital data items, and may allow integration application 110 access to any digital data items generated or used by first party applications 115. First party applications 115 may include an API that allows programmatic access to application data or may make associated digital data items available in any other suitable way.

In one embodiment, client device 140 may be any computing device, including, but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, minicomputers, and the like. Although not shown, client device 140 may communicate with data storage device 120 using any suitable method. Client device 140 may include applications, such as operating system software or applications 145. Applications 145 may be any application executing on client device 140 or accessed by client device 140. Application 145 may be used to access integration application, may be a thick client version of integration application 110, or may be used by integration application 110 to provide some of the data items or functionalities described above, such as by using a plugin, module, APIs, or other programmatic methods.

3. Example Functional Implementation

Figure 2:
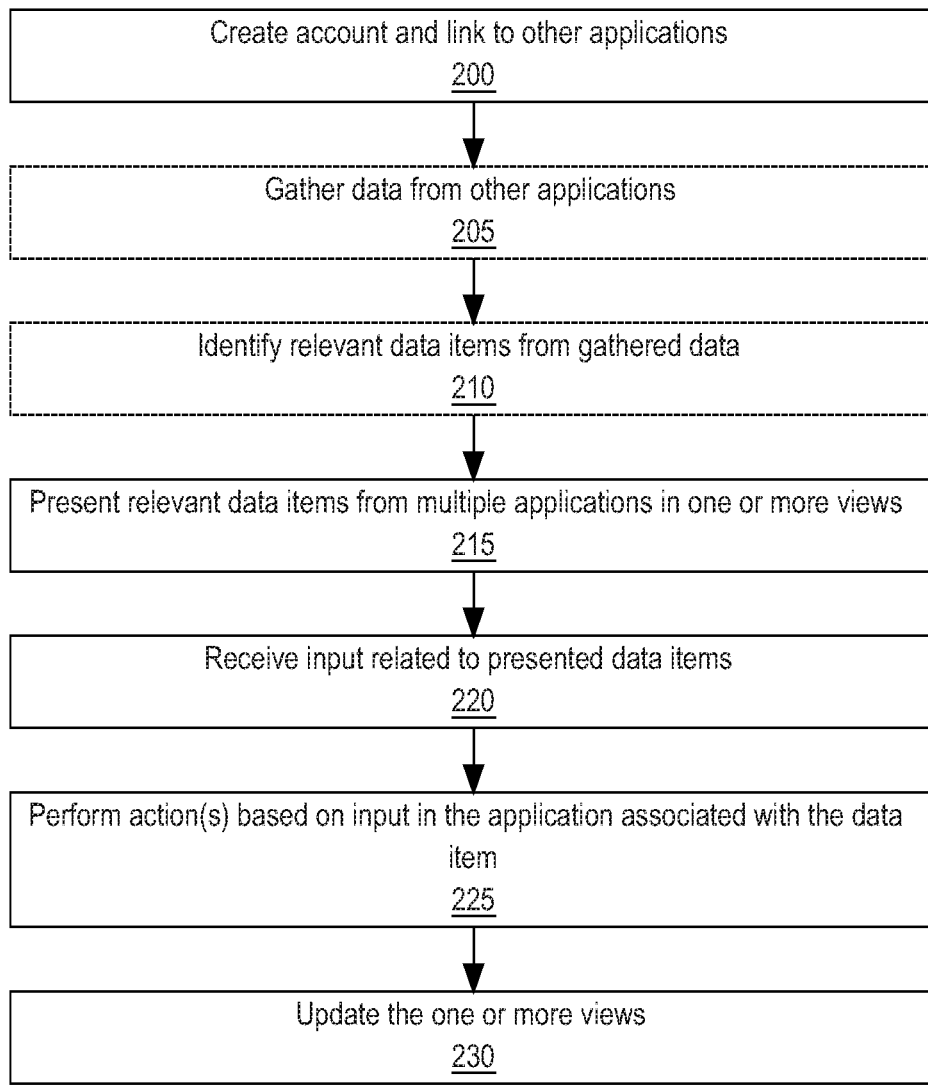
FIG. 2 illustrates a data processing algorithm or method for integrating views of multiple applications and providing action options in accordance with an embodiment of the invention.
Figure 3:
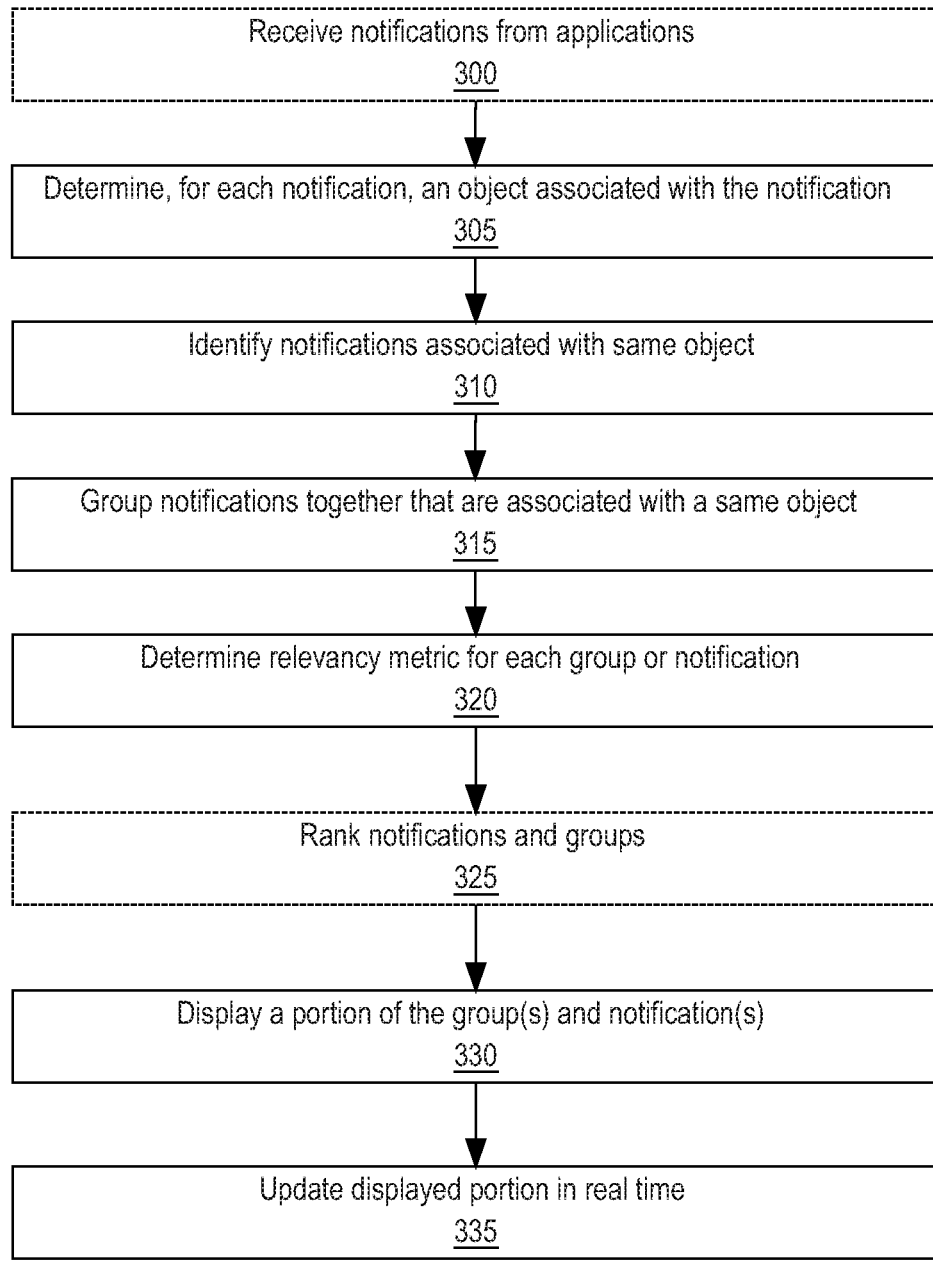
FIG. 3 illustrates a data processing algorithm or method for a work feed of multiple applications with object-based grouping in accordance with an embodiment of the invention.
Figure 4:
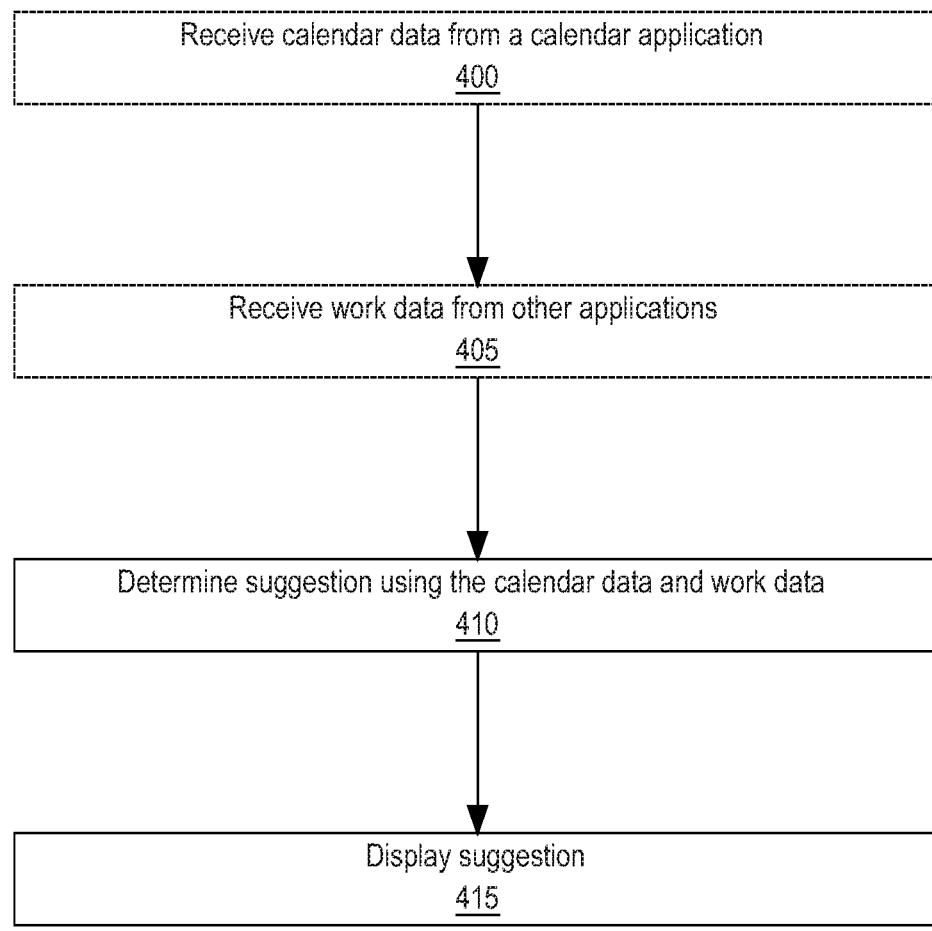
FIG. 4 illustrates a data processing algorithm or method for providing suggestions using data from multiple applications in accordance with an embodiment of the invention.

FIG. 2, FIG. 3, and FIG. 4 show example flowcharts of methods. Although the steps in FIG. 2, FIG. 3, and FIG. 4 are shown in an order, the steps of FIG. 2, FIG. 3, and FIG. 4 may be performed in any order, and are not limited to the order shown in FIG. 2, FIG. 3, and FIG. 4. Additionally, some steps may be optional, may be performed multiple times, or may be performed by different components. All steps, operations and functions of a flow diagram that are described herein are intended to indicate operations that are performed using programming in a special-purpose computer or general-purpose computer, in various embodiments. In other words, each flow diagram in this disclosure is a guide, plan or specification of an algorithm for programming a computer to execute the functions that are described.

3.1 Integrating Views of Multiple Applications and Providing Action Options

FIG. 2 shows an example flowchart of a method of integrating views of multiple applications and providing action options.

In step 200, an account is created and linked to other applications. The account may be created in any manner by any application. The account is specific to a particular user and is used to provide the context or viewpoint, so that presented data is correctly tailored to the account. Any number of other applications or data sources may be linked to the created account in any manner. The linked applications or data sources are subsequently accessed to gather data and then present the most relevant data to the account user. The applications or data sources may be linked in any manner, such as by providing a username and password for access, installing an integration or module, or by any other method. The applications may be developed by any number of different developers or providers.

In step 205, data is gathered from other applications. The data may be gathered in any manner, in any format, and any quantity of data may be gathered. For example, data may be accessed programmatically using an API, may be gathered through screen scraping, or using other methods. The gathered data may include copies of files or documents or may include links directly to the location where the files or documents may be accessed by their associated application. Alternatively, other applications may send data automatically, and the data may be received in any manner. As indicated by the dotted lines, step 205 may be performed at any time, and may be performed continuously. Further, step 205 may be performed for many different accounts simultaneously. Thus, for example, data may be gathered for all accounts related to a particular business.

In step 210, relevant data items are identified. The relevant data items may be identified using one or more machine learning algorithms, or other methods. The relevant data items may be ranked or rated for their relevancy, and multiple different rankings or ratings may be maintained, such as one per type of view presented. Further, aggregated data may be used in identifying relevant data items, such as data from a group of accounts from a same team or company, or data of multiple users relating to a particular application. This aggregated data may allow for suggestions to be made with respect to other accounts, such as "Sam is free for lunch in 45 minutes." Likewise, by processing data from other accounts, more accurate relevancy determinations may be made, as actions taken by coworkers may be identified, and a more complete picture of the account user's work and workday may be generated. As indicated by the dotted lines, step 210 may be performed at any time, and may be performed continuously.

In step 215, relevant data items from multiple applications are presented in one or more views. Any number of views may be customized, configured, or selected by a user of an account, so that relevant data may be presented in any manner. Multiple different views may be presented on a single screen or display or may span multiple different screens or displays. Examples of views include, but are not limited to: quick actions, deep focus, recent, notifications, starred, recaps, or future events. Any additional data may be presented alongside the data item(s) or a description of the data item(s). Additional data may include, but is not limited to: a button to take an action in relation to the data item, an icon of and/or link to an application associated with the data item(s), pictures or names of other accounts that took an action in relation to the data item(s), timestamps, or metadata In step 220, input related to one or more of the presented data items is received. The input may be received in any manner, any format, and at any time. The input may indicate a particular action to perform such as "post a comment" as well as more specific details about the action, such as the content of the comment. Any number of different inputs may be received. The inputs may be received, for example, from a single button that presents an option for the most relevant action to the data item. The button allows a user of the account to perform the related action within the associated application without navigating away from the current view. Thus, a user of the account is able to perform multiple different actions in multiple different applications from a single view.

In step 225, actions are performed in the application(s) associated with particular data items based on the input. The actions may be performed in any manner by the associated application(s). The actions to be performed may be communicated to the applications in any manner, such as sending instructions to the application(s) via an API or integration. Any number of actions may be performed in any number of different applications, at any time.

In step 230, one or more views are updated. Specifically, the views are updated to reflect any changes made to data items in response to actions performed in step 225. For example, the one or more views may be updated to remove a data item if a task associated with the data item has been completed and is no longer relevant. As another example, the one or more views may be updated to show that a comment made by the user of the account has been posted.

Using the above method, the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams.

Additionally, the above method may reduce the usage of computing power, memory, and/or bandwidth by consolidating and/or streamlining the availability of digital data items. Further, the overall usability and functionality of the computing device and associated applications is also greatly increased.

3.2 Work Feed of Multiple Applications with Object Based Grouping

FIG. 3 shows an example flowchart of a method of providing a work feed of multiple applications with object-based grouping.

In step 300, notifications are received from applications. The notifications may be received in any format, in any order, and at any time. The notifications may be received from any number of different applications and may contain any type of data or information. For example, the notification may identify an action performed, the digital data file the action was performed on, and who performed the action. The notifications may include metadata, such as a timestamp or other information. As indicated by the dotted lines, step 300 may be performed continuously.

In step 305, an object associated with each notification is determined. The object may be identified in any manner. The object may be a digital data file, a particular website or document, or a particular user account. Natural Language Processing or other processing steps may need to be performed to determine the object associated with each notification.

In step 310, notifications associated with a same object are identified. The notifications may be identified in any manner, and at any time.

In step 315, notifications that are associated with the same object are grouped together. Any number of notifications may be grouped together, and they notifications may be grouped in any manner or format. For example, if a lengthy discussion is happening on a Wiki page (the Wiki page is the object), then 60 or 70+ notifications that users have posted a comment may be grouped together. Thus, rather than displaying 70+ notifications explaining that "Janice posted a comment," or "Jack posted a comment," a single, expandable item may be displayed explaining that, "Janice, Jack, and 68 others commented . . . "

In step 320, relevancy metric for each group and/or each notification are determined. The relevancy metric is account specific. Thus, the work feed is customized to a specific account. The relevancy metric may be based on any number of factors. Time, such as how recently a notification was received, is one such factor. Other factors may include, whether the object is watched or followed, whether the object has been created, edited, or managed by the account, or whether the object is assigned to a team or organization that the account is a part of In step 325, the notifications and groups are ranked. The ranking may be made at any time and may be updated or changed at any time for any reason. Groups may be ranked equally to individual notifications or may be given preference. As indicated by the dotted lines, step 325 is optional.

In step 330, a portion of the group(s) and notification(s) are displayed. The groups and notifications may be displayed based on their rank or relevancy metric or based on any other factor. Any number of groups and/or notifications may be displayed.

In step 335, the displayed portion is updated in real time. The displayed portion may be updated based on receiving new notifications, clearing old notifications, or based on any other factors. For example, if a new notification is received and is assigned to a group, that group may be ranked higher, and may move up to the top spot of the work feed. The displayed portion may be updated in any manner, at any time.

The examples in this section have discussed grouping by notifications, but that form of grouping is not required. Additionally or alternatively, similar data processing steps may be implemented to cause grouping by product or application, or type of action.

Using the above method, the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams.

Additionally, the above method may reduce the usage of computing power, memory, and/or bandwidth by consolidating and/or streamlining the availability of digital data items. Further, the overall usability and functionality of the computing device and associated applications is also greatly increased.

3.3 Suggestions Using Data from Multiple Applications

FIG. 4 shows an example flowchart of a method of providing suggestions using data from multiple applications.

In step 400, calendar data is received from a calendar application. The calendar data may be received or accessed at any time, in any format, and in any manner. Any amount of calendar data may be received. Calendar data for multiple different accounts may be received. For example, the calendar data for an entire team or organization may be received.

In step 405, work data is received from other applications. The work data may be received or accessed at any time, in any format, and in any manner. Any number of different applications may provide work data including, but not limited to, productivity applications, word processing applications, spreadsheet applications, email applications, chat applications, video applications, finance applications, or business applications. Any amount or quantity of work data may be received. The work data received may relate to one or more accounts. For example, work data for an entire team or organization may be received.

In step 410, suggestions are determined using the calendar data and the work data. The suggestions are determined using the calendar data of an account and work data, either related to the account or a different account, to generate customized suggestions specific to the account. Optionally, calendar data of another account may also be used. The combination of calendar data and work data allow many different suggestions to be generated that may improve the work quality, work volume, or overall effectiveness of a worker.

For example, suggestions may involve identifying "snack work"—work that may be completed in a short amount of time. Then, using calendar data, identifying gaps in the worker's schedule and suggesting that the worker perform the snack work in the short breaks between meetings. As another example, "deep work"—work that takes a longer period of time and a larger amount of focus to complete, may be identified. Then, using the calendar data large blocks of time may be identified and blocked off for the specific purpose of performing the deep work. Additionally, the suggestion may include shutting down or limiting interruptions from email, chat, or telephone, such as by setting a do not disturb status, while performing the deep work.

As another example, the suggestion may include identifying when a coworker is working on a particular object or document and in response, determining when both the account user and the coworker are free to meet and discuss the changes made to the particular object or document. Determining free time may be implemented by programmatically querying calendar data for the account user and the coworker. In some embodiments, suggestion processing logic may be programmed to determine that the coworker is scheduled in a different meeting but in a location close to the account holder; in response, the suggestion processing logic may be programmed to notify the account holder that a local meeting with the coworker is possible in a specified range of travel dates. Thus, implementations may process both a work graph that represents relationships between coworkers, teams and groups in an enterprise, or social graph of the account holder and other accounts that have relationships to the account holder, and calendar data.

Additionally, the suggestions may include particular media posts, articles, documents, objects, or other items that the account user may be interested in or may assist in their workday. In one embodiment, suggestion processing is programmed to identify one or more documents that are relevant, based on metadata tags of the documents, title or content, to a forthcoming meeting that is associated with a user account. These examples are but a few of the possibilities for suggestions based on calendar and work data, and the invention should not be limited to the above examples.

Processing suggestions may include programmatically transmitting queries to applications that execute as part of a federated system of applications, or to third-party products via APIs or other programmatic interfaces that those products expose and permit the suggestion processing logic to access.

In step 415, the suggestion(s) are displayed. The suggestions may be displayed in any manner, in any format, and at any time. The suggestions are specific to the user of the account and may change or update in real time. The suggestions may include links or buttons that allow for quick action on the suggestions, or that direct the user to the specific portion of a document or object, in the associated application, to which the suggestion was directed.

Using the above method, the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams.

Additionally, the above method may reduce the usage of computing power, memory, and/or bandwidth by consolidating and/or streamlining the availability of digital data items. Further, the overall usability and functionality of the computing device and associated applications is also greatly increased.

4. Implementation Examples

FIG. 5, FIG. 6, FIG. 7, and FIG. 8 illustrate examples in accordance with embodiments of the invention. The examples shown in FIG. 5, FIG. 6, FIG. 7, and FIG. 8 have been simplified for ease of explanation, and do not show every aspect in full detail, and the invention should not be limited to the examples shown.

4.1 Integrating Views of Multiple Applications and Providing Action Options

Figure 5:
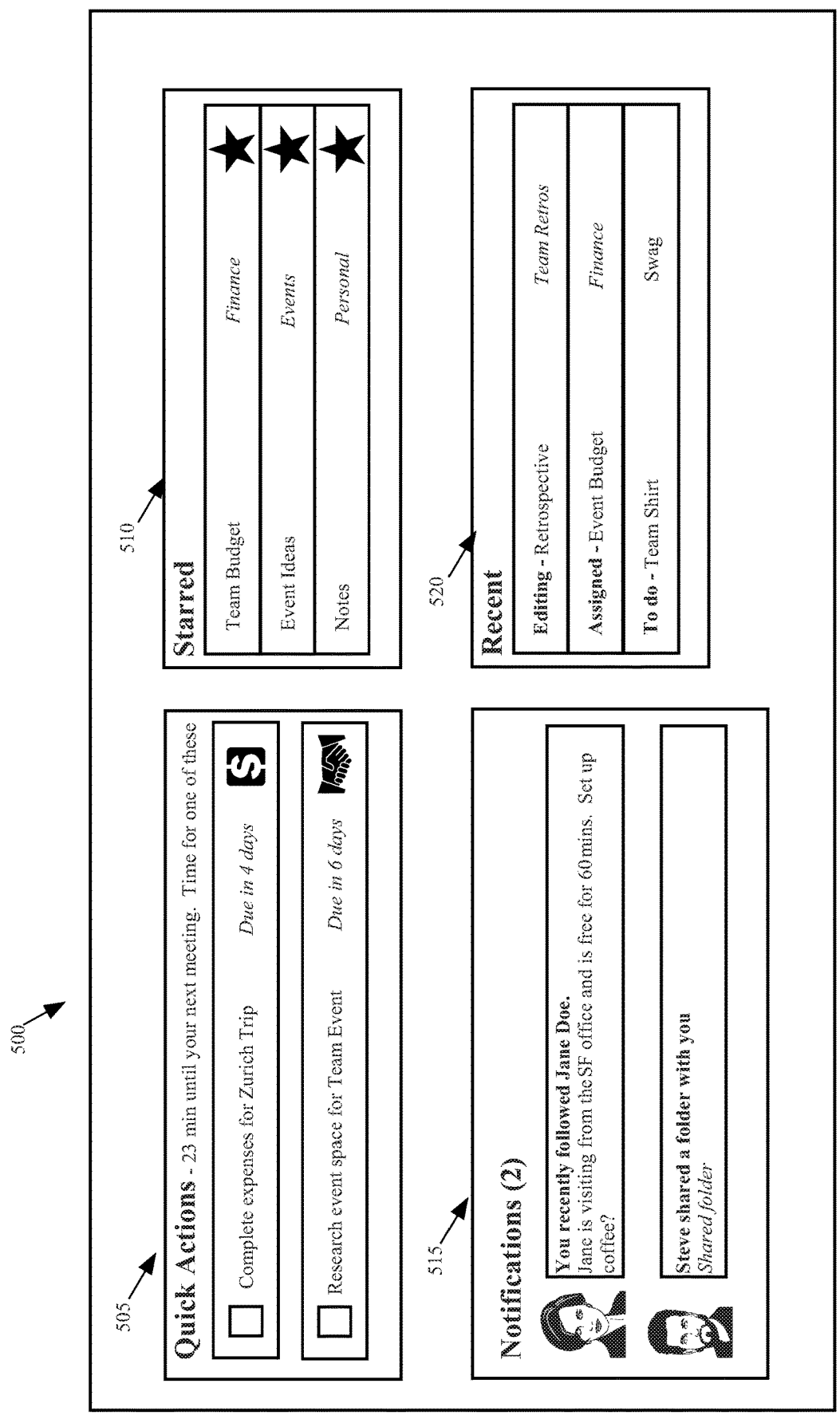
FIG. 5 illustrates an example of integrating views of multiple applications and providing action options in accordance with an embodiment of the invention.
Figure 6:
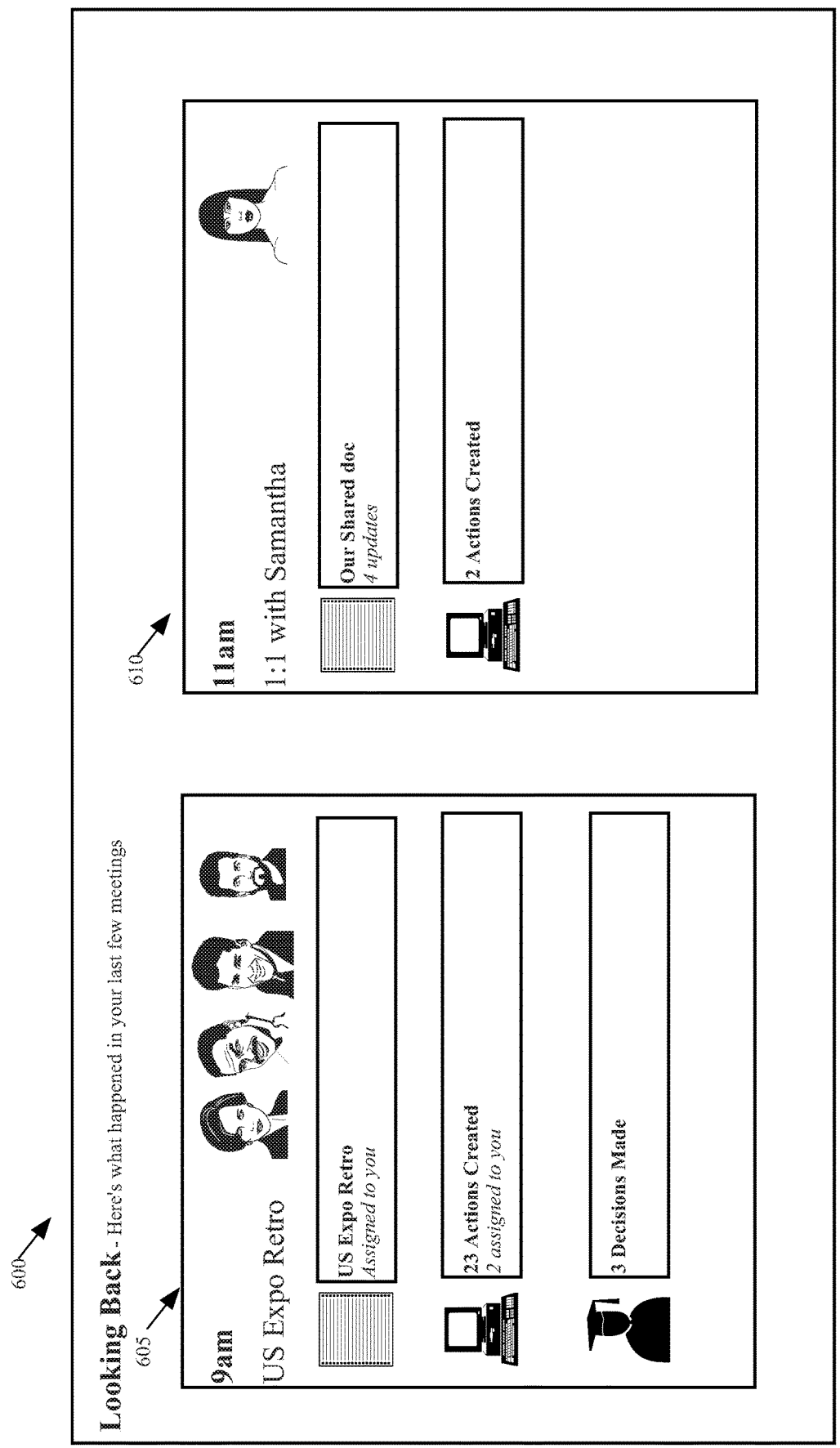
FIG. 6 illustrates an example of integrating views of multiple applications and providing action options in accordance with an embodiment of the invention.

FIG. 5 and FIG. 6 illustrate examples of integrated views of multiple applications with action options in accordance with an embodiment of the invention.

FIG. 5 shows a screenshot 500 with integrated views of multiple applications—view A 505, view B 510, view C 515, and view D 520. View A 505 shows suggested quick actions—actions that can be completed before the user's next scheduled meeting. These suggested quick actions include completing expenses for the Zurich Trip using an expense application (indicated by the dollar sign icon) or researching event space for a team event using an event application (indicated by the handshake icon). When clicked, the icons may provide a dialogue to take a particular action that has been determined to be the most likely or most relevant action with respect to the data item. This way, actions may be taken within the associated application without having to leave the integration application, or even leaving view A 505. Alternatively, the user may click the data item itself to be deep linked to an applicable portion of the document within the associated application. Due dates are also associated with these tasks. To make these suggestions, data was gathered from a calendaring application, the expense application, and the event application. Data was also gathered from other applications, which are not shown. The gathered data was processed, and the two quick actions shown were the most relevant data items from all of the gathered data for "quick actions."

View B 510 shows a starred items view. The starred items have been previously starred or favorited by the user of the account. The starred items are a team budget in a finance application, event ideas in an event application, and notes from a word processing application. Labels for the items are shown, as are the star icons to indicate that they are starred or favorited. To display these data items, data had to be gathered from the finance application, the event application, and the word processing application. By clicking on a particular data item the user of the account will be directed, via deep linking, to the relevant portion of the document or documents within the associated application.

View C 515 shows a notifications view. The notifications are sent by the various applications linked in the account. The notifications are ranked or rated based on their relevancy, as there are currently more than two recent notifications, but only the two most relevant notifications are shown. The notifications include a suggestion to have coffee with Jane Doe, since the account user has recently followed Jane Doe on a social network. The other notification is showing that Steve has shared a folder with the account user. To present the two notifications, data was gathered from at least a productivity application associated with the shared folder, a calendaring application, and a social media application. Additionally, calendar data for Jane Doe was also gathered and processed to be able to make the suggestion for coffee, as Jane Doe has a time block available on her calendar in 60 minutes. Like the other views, view C 515 is custom tailored to the account and shows the most relevant data items for that account at the current moment in time for the views presented.

View D 520 shows recent work done by the user of the account. View D 520 shows that editing has been recently performed on a retrospective in a productivity application, that the account has been assigned a task related to an event budget in a finance application, and that a to-do item about team shirts was added in a to do application. Data was gathered from the productivity application, the finance application, and the to-do application to present these data items. The items shown in View D 520 are organized by which document or application was most recently accessed, although other ordering of information may be used. As in other views, if an individual item is clicked the user of the account will be deep linked to the particular portion of the relevant document in the associated application, such as opening a document to the exact page and paragraph where edits were last made. Alternatively, clicking an individual item may perform any other action. Further, additional information may be displayed, such as a button for performing the most likely action based on the information being presented. For example, the most likely action for the "Assigned—Event Budget" item may be "approve." The button may be presented in any manner or format, in any location, and may perform any action in response to user input.

Turning to FIG. 6, screenshot 600 is shown, which is "Looking Back" and shows the account user what has happened with respect to his or her meetings earlier in the day. Data relating to many different accounts and data associated with many different applications was gathered to identify the relevant data items for these views, as the meetings could have covered any topic, and subsequent actions (both during and after the meetings ended) could be performed by any number of people. Meeting attendee data from various calendar applications may be used to identify accounts that may be performing actions related to a topic or topics of the meeting(s). Likewise, timestamps or other metadata may have been used to identify documents or files created, accessed, or modified during the meeting, and subsequent actions related to those documents may have been tracked. These documents or files may be processed using natural language processing or other methods to determine the likelihood that their content or modifications are related to a meeting that occurred or is occurring. Likewise, email or chat messages sent or received by the attendees of the meeting may have been processed using natural language processing or any other method to aid in identifying relevant data items.

In view E 605, relevant data items to a 9 am meeting that discussed the "US Expo Retro" are shown. Pictures of the four other attendees of the meeting are shown in the top right. These pictures may have been gathered from a networking application or social profile, or any other suitable source. The relevant outcomes of the meeting are shown below the pictures of the attendees: a document was assigned to the account holder, 23 actions were created (2 of which are assigned to the account), and 3 decisions were made. The presented data items allow for easy access to the relevant files or documents (such as by clicking the associated data item/object) and allow a user to quickly and easily understand what the outcomes of a meeting are. As with the other views, view E 605 is uniquely tailored to the specific account. Thus, if another attendee of the meeting were to view their own "looking back at the 9 am US Expo Retro Meeting" view, the data items shown would be different. For example, another attendee may still see "23 actions created" in their retrospective view, but the information below may say "8 assigned to you," instead of "2 assigned to you."

Likewise, View F 610 shows the results of a one on one meeting with Samantha at 11 am. Four updates were made to a shared document, and two actions were created. The updates to the shared document occurred after the conclusion of the meeting, and they were identified as relevant because the shared document was opened and viewed by both the current account and Samantha's account during the 11 am meeting. Thus, when the updates were subsequently made by Samantha, they were identified as highly relevant to the particular view shown in view F 610. The view shown in view F 610 may update in real time.

FIG. 5 and FIG. 6 show but a few possible examples of the different views that may be presented. Any number of views covering any type or context of work may be generated, shown, and/or customized to the needs of a specific account. For example, if an account has a reoccurring event every week, such as submitting an expense report, then a recurring work view may be relevant to display the day or two before the expense report is due. Other example views may be: "recently viewed documents," "recently viewed documents of teammates," "recent changes from teammates," or "activity feed,"

The examples highlight various ways that the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams. Additionally, the examples shown may reduce the usage of computing power, memory, and/or bandwidth by consolidating and/or streamlining the availability of digital data items. Further, the overall usability and functionality of the computing device and associated applications is also greatly increased.

4.2 Work Feed of Multiple Applications with Object Based Grouping

Figure 7:
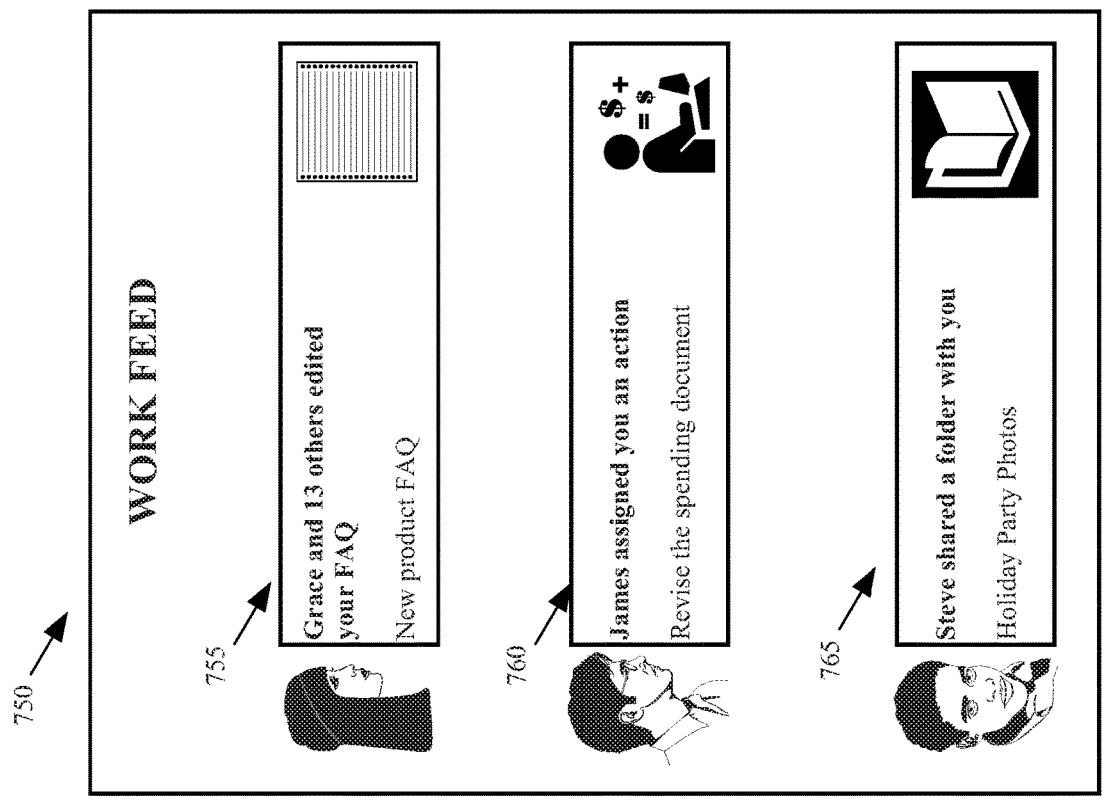
FIG. 7 illustrates an example of a work feed of multiple applications with object-based grouping in accordance with an embodiment of the invention.
Figure 7:
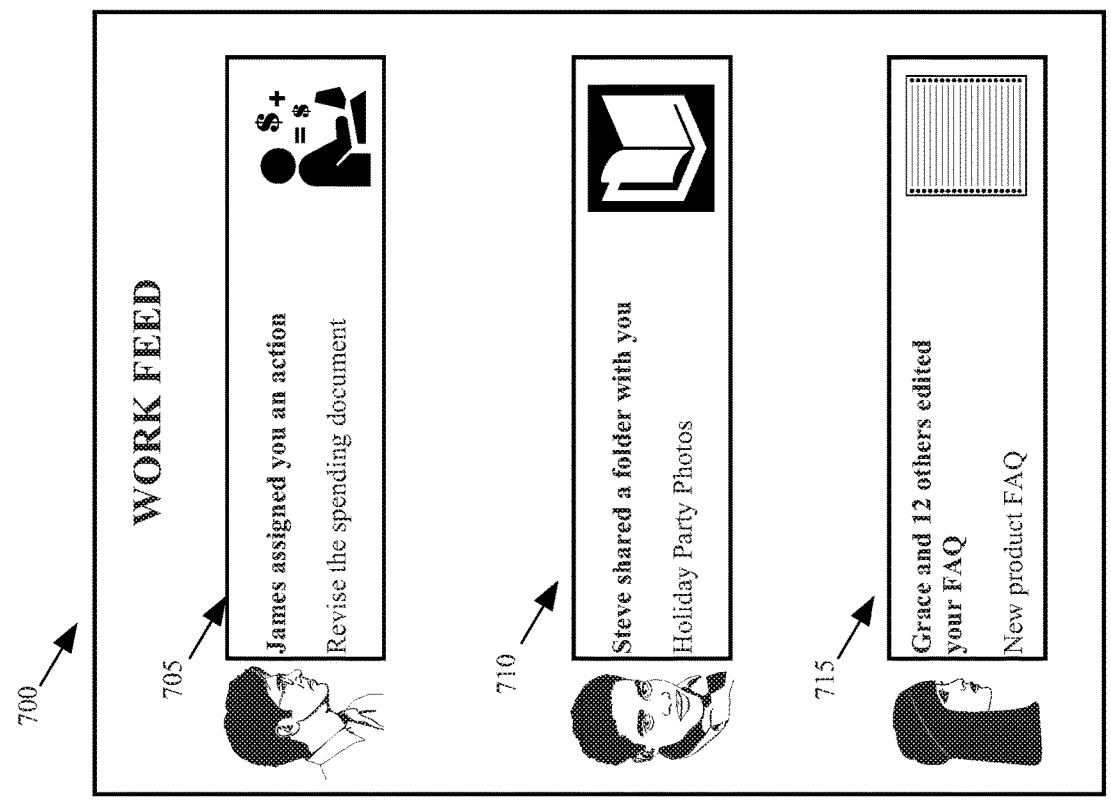

FIG. 7 illustrates an example of a work feed of multiple applications with object-based grouping in accordance with an embodiment of the invention.

In FIG. 7, two screenshots are shown, Screenshot A 700 and screenshot B 750. In screenshot A 700, a work feed is shown. The work feed shown in screenshot A 700 is organized by time, with the most recently received notifications at the top. As with other examples, the work feed shown in screenshot A 700 is specific to the user of the account. The notifications may be received or accessed by an integration application in any suitable manner.

The work feed includes object A 705, object B 710, and object C 715. Object A 705 shows that James has assigned an action, "revise the spending document," to the account holder. By clicking the icon or any other suitable part of Object A 705, the user of the account will be taken to the exact portion of the spending document within the associated application that needs to be revised. Although not shown, a single button may be displayed that allows the user of the account to take a most relevant action related to Object A 705 from the integration application.

Object B 710 is a direct share of a folder with the user of the account. Specifically, Steve shared the holiday party photos. By clicking the icon the user of the account will be taken directly to the holiday party photo folder within the associated photo sharing application.

Object C 715 is a group of notifications all related to the same object—the "new product FAQ." In total there are 13 notifications that are grouped into object C 715. The 13 notifications may have been received over any amount of time, although in this example the 13 notifications have been received since the last time that the user of the account viewed their work feed. Object C 715 is shown last on the work feed because the most recently notification that has been grouped together for object C 715 was received after the notifications associated with object A 705 and object B 710.

Screenshot B 750 shows the same screenshot as screenshot A 700, except that screenshot B 750 occurs a few seconds after the screenshot shown in screenshot A 700. In that time, a new notification was received. That notification was determined to be associated with object C 755 and was added to the object. Thus, object C 755 now explains that 14 notifications are grouped together. Likewise, the work feed has been updated, in real time, to reflect the new ordering of notifications. Thus, object C 755 is shown before object A 760 and object B 765. Nothing has changed in object A 760 or object B 765, other than they have been pushed lower on the work feed.

The example highlights various ways that the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams. Additionally, the examples shown may reduce the usage of computing power, memory, and/or bandwidth by consolidating and/or streamlining the availability of digital data items. Further, the overall usability and functionality of the computing device and associated applications is also greatly increased.

4.3 Suggestions Using Data from Multiple Applications

Figure 8:
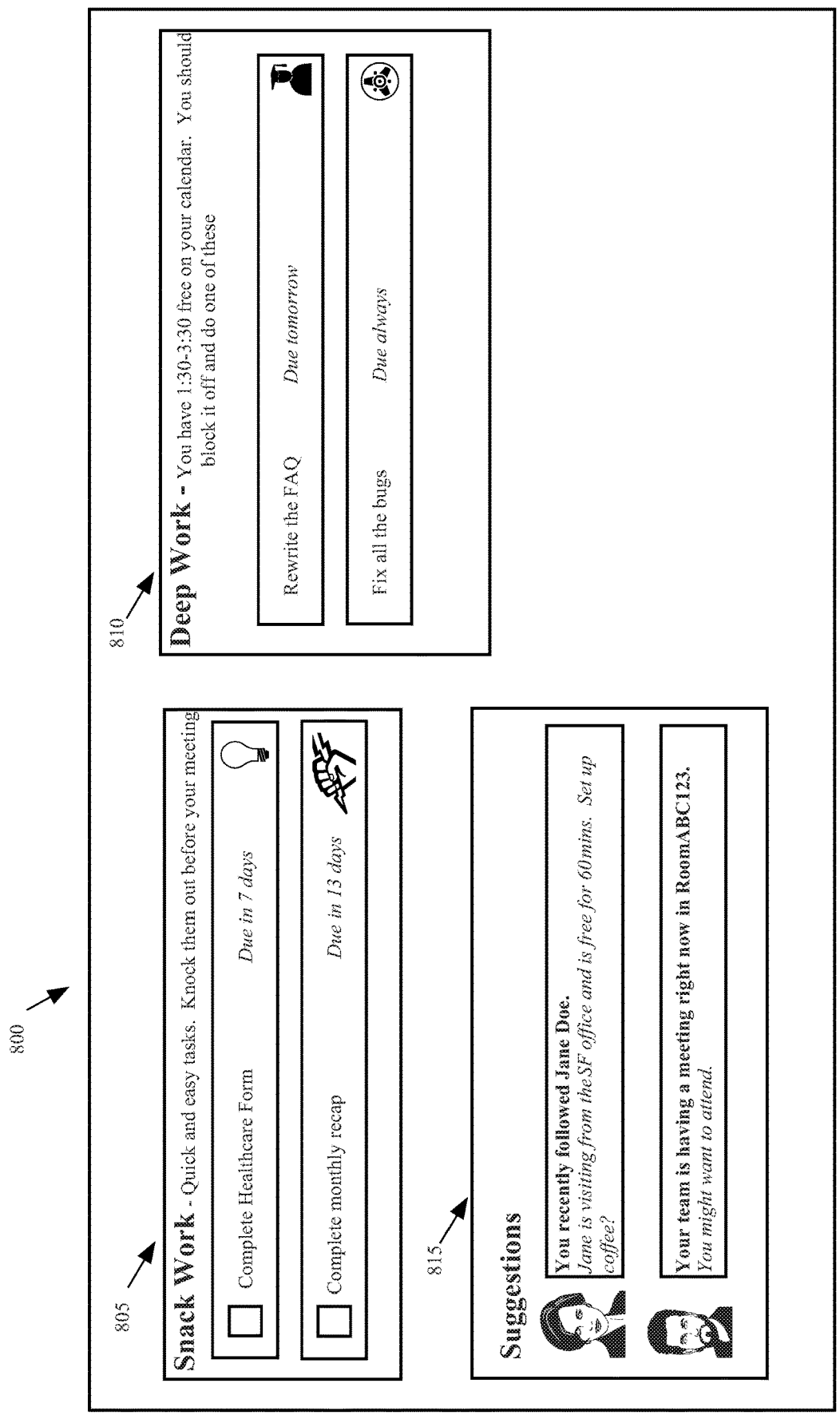
FIG. 8 illustrates an example of suggestions using data from multiple applications in accordance with an embodiment of the invention.

FIG. 8 illustrates an example of suggestions using data from multiple applications in accordance with an embodiment of the invention.

In FIG. 8 shows screenshot 800, that includes various suggestions based on data from multiple applications. The suggestions are tailored to a specific user account, using their calendar data and work data, as well as utilizing calendar data and work data of other accounts, as needed. The suggestions may update in real time. For example, upon completion of a particular task or item, a new task or item may take the place of the completed task or item.

Specifically, in FIG. 8, three suggestions are shown, suggestion A 805, suggestion B 810, and suggestion C 815. Suggestion A 805 deals with "snack work." Snack work is quick items or projects that may be completed rapidly. Efficiently using small blocks of time, such as time between meetings, can greatly increase overall productivity. Thus, suggestion A 805 shows short tasks that may be completed. The tasks include completing a healthcare form and a monthly recap. As in other views, clicking a particular task or item will deep link the user of the account to the appropriate section of the associated application so that the task may be performed. Alternatively, or in addition, a single button may be included that allows the user of the account to directly perform an action, within the associated application, from the integration application.

Suggestion B 810 shows suggested "deep work," or work that may take a longer time and more focus to accomplish. The deep work suggestion is to block off a particular available time in the calendar and perform either "rewrite the FAQ" or "fix all the bugs." The suggestion may also include putting on a do not disturb mode for distractions, like email, text messages, chat messages, or notifications, or shutting down other applications that may distract. The applications may be restarted, or the status removed upon completion of the task. By clicking either task shown in suggestion B 810, the 1:30-3:30 period in the calendar of the user account will be blocked off. At the appointed time, an associated application may automatically open to the relevant portion associated with the task.

Suggestion C 815 include setting up coffee with another user or teammate, and a suggestion to attend a meeting that is currently happening. The suggestion to set up coffee is based on calendar data from both the user account and Jane Doe's account and based on the user account following Jane Doe in a social application. The other suggestion, to attend a team meeting, is based on calendar data of other members of a team the user account is associated with.

The example highlights various ways that the workday experience of knowledge workers may be vastly improved. The knowledge workers will be able to select whatever combination of applications works best for them, while still receiving a consolidated, integrated view of all information relevant to their workdays in a single location. This greatly simplifies the task of determining what work is to be done at a particular point in time and reduces inefficiencies of using multiple applications by different developers and reduces the inefficiencies of working in teams. Additionally, the examples shown may reduce the usage of computing power, memory, and/or bandwidth by consolidating and/or streamlining the availability of digital data items. Further, the overall usability and functionality of the computing device and associated applications is also greatly increased.

The specification of this disclosure also includes the subject matter of the following numbered clauses:

25. A computer-implemented method comprising: receiving calendar data from a calendar database of a calendar application that is associated with an account in a computer system; receiving one or more work data items from one or more other computer program applications that are also associated with the account; determining, using the calendar data and the one or more work data items, a suggestion of an action item for the account from among a plurality of digitally stored task items; causing displaying the suggestion of the action item; wherein the method is performed using one or more computing devices.

26. The method of clause 25, the method further comprising: processing the work data item to determine an expected amount of time to complete a task associated with the work data item; in response to the processing, automatically creating a new calendar item in the calendar database associated with the account having a time period equal to the expected amount of time and identifying the work data item.

27. The method of clause 25, wherein the application is a networking application, and wherein the suggestion is to meet up with a user of another account.

28. One or more non-transitory digital storage media storing one or more sequences of program instructions which, when executed using one or more processors, cause the one or more processors to perform: receiving calendar data from a calendar database of a calendar application that is associated with an account in a computer system; receiving one or more work data items from one or more other computer program applications that are also associated with the account; determining, using the calendar data and the one or more work data items, a suggestion of an action item for the account from among a plurality of digitally stored task items; causing displaying the suggestion of the action item.

29. The storage media of clause 28, further comprising sequences of instructions which when executed cause: processing the work data item to determine an expected amount of time to complete a task associated with the work data item; in response to the processing, automatically creating a new calendar item in the calendar database associated with the account having a time period equal to the expected amount of time and identifying the work data item.

30. The storage media of clause 28, wherein the application is a networking application, and wherein the suggestion is to meet up with a user of another account.

5. Implementation Example—Hardware Overview

According to one embodiment, the techniques described herein are implemented by at least one computing device.

The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
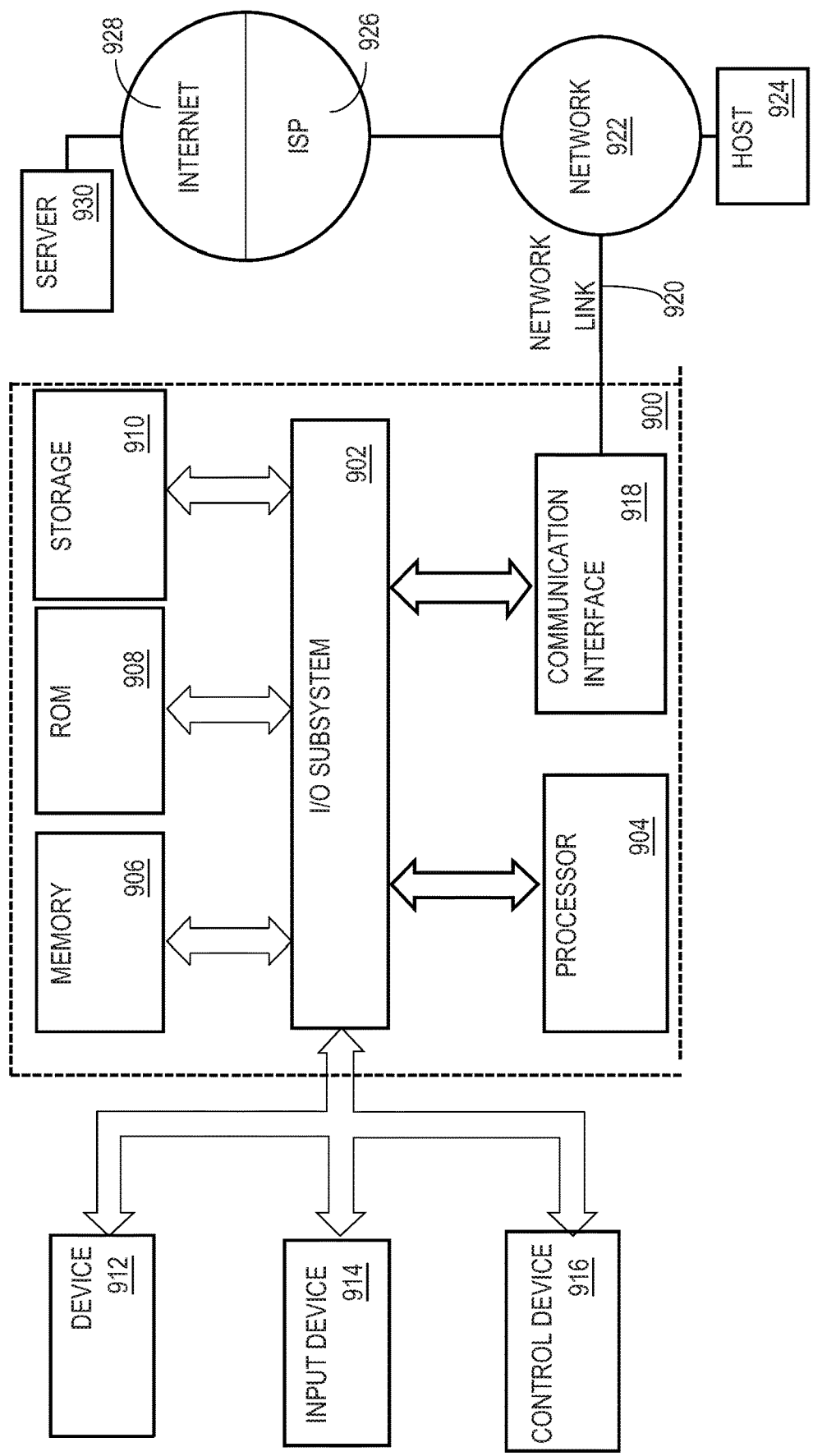
FIG. 9 shows a block diagram of a computer system with which an embodiment of the invention may be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanism(s) for communicating information and/or instructions between the components of the computer system 900 over electronic signal paths. The I/O subsystem 902 may include an I/O controller, a memory controller and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or other dynamic storage device. Memory 906 also may be used for storing temporary variables or other intermediate information during execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read only memory (ROM) 908 or other static storage device coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disk such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 900 may be coupled via I/O subsystem 902 to at least one output device 912. In one embodiment, output device 912 is a digital computer display. Examples of a display that may be used in various embodiments include a touch screen display or a light-emitting diode (LED) display or a liquid crystal display (LCD) or an e-paper display. Computer system 900 may include other type(s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators or servos.

At least one input device 914 is coupled to I/O subsystem 902 for communicating signals, data, command selections or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on display 912. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 914 may include a combination of multiple different input devices, such as a video camera and a depth sensor.

In another embodiment, computer system 900 may comprise an internet of things (IoT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware and interfaces for generating position reporting packets, notifications, pulse or heartbeat signals, or other recurring data transmissions that specify a position of the computer system 900, alone or in combination with other application-specific data, directed toward host 924 or server 930.

Computer system 900 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infra-red data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 such as place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to bus 902. Communication interface 918 provides a two-way data communication coupling to network link(s) 920 that are directly or indirectly connected to at least one communication networks, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 922 broadly represents a local area network (LAN), wide-area network (WAN), campus network, internetwork or any combination thereof. Communication interface 918 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through a network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a world-wide packet data communication network represented as internet 928. A server computer 930 may be coupled to internet 928. Server 930 broadly represents any computer, data center, virtual machine or virtual computing instance with or without a hypervisor, or computer executing a containerized program system such as DOCKER or KUBERNETES. Server 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server 930 may form elements of a distributed computing system that includes other computers, a processing cluster, server farm or other organization of computers that cooperate to perform tasks or execute applications or services. Server 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 930 may comprise a web application server that hosts a presentation layer, application layer and data storage layer such as a relational database system using structured query language (SQL) or no SQL, an object store, a graph database, a flat file system or other data storage.

Computer system 900 can send messages and receive data and instructions, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

6. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   accessing a first plurality of different computer program applications that are associated with a first account;
   retrieving first data items that are associated with the first account from among the first plurality of different computer program applications;
   accessing a second plurality of different computer program applications that are associated with a second account, the second account being different from the first account;
   retrieving second data items that are associated with the second account from among the second plurality of different computer program applications;
   identifying, using the first data items and the second data items, relevant data items specific to the first account and obtained from at least one of the first plurality of different computer program applications or the second plurality of different computer program applications, the relevant data items including two or more of a third data item, a fourth data item, a fifth data item, or a sixth data item;
   causing a display of, using a computer display device, an integrated view of the first account, the integrated view comprising at least the two or more of the third data item, the fourth data item, the fifth data item, or the sixth data item, the integrated view generated by an integration application;
   receiving, via the integrated view of the integration application, an input specifying an action associated with a selected data item of the two or more of the third data item, the fourth data item, the fifth data item, or the sixth data item; and
   in response to the input, implementing the action on an object of an application using an application programming interface (API), the action including one or more of: making a change to a document of the application, posting a comment to content provided by the application, or approving an item tracked by the application, the action being performed within the application, via the API, without navigating away from the integrated view, wherein:

the method is performed using one or more computing devices;

the third data item was at least one of created, accessed, modified, sent, or received during an event that has already occurred;

the fourth data item corresponds to a first suggestion to perform a shorter duration task during a gap in a schedule of the first account;

the fifth data item corresponds to a second suggestion to perform a longer duration task; and the sixth data item corresponds to a third suggestion to coordinate a meeting with the second account based on a mutual availability.

2. The computer-implemented method of claim 1, further comprising updating the integrated view of the first account in response to receiving a notification specifying that the action was performed in the application associated with the selected data item.

3. The computer-implemented method of claim 1, wherein:

the input is a first input; and the computer-implemented method further comprises receiving a second input specifying a first application and a second application from among the first plurality of different computer program applications as the only applications from which to retrieve the first data items.

4. The computer-implemented method of claim 1, further comprising identifying the relevant data items by executing a machine learning classifier algorithm using at least one of the first data items or the second data items.

5. The computer-implemented method of claim 1, further comprising, in the integrated view, displaying one or more graphical widgets near the two or more of the third data item, the fourth data item, the fifth data item, or the sixth data item, the one or more graphical widgets programmed when selected for performing the action.

6. One or more non-transitory digital storage media storing one or more sequences of program instructions which, when executed using one or more processors, cause the one or more processors to:

access a first plurality of different computer program applications that are associated with a first account;

retrieve first data items that are associated with the first account from among the first plurality of different computer program applications;

access a second plurality of different computer program applications that are associated with a second account, the second account being different from the first account;

retrieve second data items that are associated with the second account from among the second plurality of different computer program applications;

identify, using the first data items and the second data items, relevant data items specific to the first account and obtained from at least one of the first plurality of different computer program applications or the second plurality of different computer program applications, the relevant data items including two or more of a third data item, a fourth data item, a fifth data item, or a sixth data item;

display, using a computer display device, an integrated view of the first account, the integrated view comprising at least the two or more of the third data item, the fourth data item, the fifth data item, or the sixth data item, the integrated view generated by an integration application;

receive, via the integrated view of the integration application, an input specifying an action associated with a selected data item of the two or more of the third data item, the fourth data item, the fifth data item, or the sixth data item; and in response to the input, implement the action on an object of an application using an application programming interface (API), the action including one or more of: making a change to a document of the application, posting a comment to content provided by the application, or approving an item tracked by the application, the action being performed within the application, via the API, without navigating away from the integrated view, wherein:

the third data item was at least one of created, accessed, modified, sent, or received during an event that has already occurred;

the fourth data item corresponds to a first suggestion to perform a shorter duration task during a gap in a schedule of the first account;

the fifth data item corresponds to a second suggestion to perform a longer duration task; and the sixth data item corresponds to a third suggestion to coordinate a meeting with the second account based on a mutual availability.

7. The one or more non-transitory digital storage media of claim 6, wherein the one or more sequences of program instructions cause the one or more processors to update the integrated view in response to receiving a notification specifying that the action was performed in the application associated with the selected data item.

8. The one or more non-transitory digital storage media of claim 6, wherein:

the input is a first input; and the one or more sequences of program instructions further cause the one or more processors to receive a second input specifying a first application and a second application from among the first plurality of different computer program applications as the only applications from which to retrieve the first data items.

9. The one or more non-transitory digital storage media of claim 6, wherein the one or more sequences of program instructions further cause the one or more processors to identify the relevant data items by executing a machine learning classifier algorithm using at least one of the first data items or the second data items.

10. The one or more non-transitory digital storage media of claim 6, wherein the one or more sequences of program instructions further cause the one or more processors to, in the integrated view, display one or more graphical widgets near the two or more of the third data item, the fourth data item, the fifth data item, or the sixth data item, the one or more graphical widgets programmed when selected for performing the action.

11. The computer-implemented method of claim 1, wherein:

the third data item is the document of the application; and the document was accessed during the event by the application and by a second application of the second plurality of computer program applications associated with the second account.

12. The one or more non-transitory digital storage media of claim 6, wherein:

the third data item is the document of the application; and the document was accessed during the event by the application and by a second application of the second plurality of computer program applications associated with the second account.

13. The computer-implemented method of claim 1, wherein:
    the input is a first input;
    the action is a first action;
    the relevant data items include the fifth data item; and
    the computer-implemented method further comprises:
        processing the fifth data item to determine an expected amount of time to complete the longer-duration task;
        automatically creating a suggested calendar item having a time period corresponding to the determined expected amount of time and identifying the fifth data item;
        displaying, using the computer display device, the integrated view comprising the suggested calendar item;
        receiving a second input specifying a second action associated with the suggested calendar item; and
        in response to the second input specifying the second action associated with the suggested calendar item, creating the suggested calendar item in a calendar database of a calendar application associated with the first account.

14. The one or more non-transitory digital storage media of claim 6, wherein:
    the input is a first input;
    the action is a first action;
    the relevant data items include the fifth data item; and
    the one or more sequences of program instructions further cause the one or more processors to:
        process the fifth data item to determine an expected amount of time to complete the longer-duration task;
        automatically create a suggested calendar item having a time period corresponding to the determined expected amount of time and identifying the fifth data item;
        display, using the computer display device, the integrated view comprising the suggested calendar item;
        receive a second input specifying a second action associated with the suggested calendar item; and
        in response to the second input specifying the second action associated with the suggested calendar item, creating the suggested calendar item in a calendar database of a calendar application associated with the first account.

15. The computer-implemented method of claim 1, wherein the action is performed within the application through the use of the API and without accessing a graphical user interface of the application.

\* \* \* \* \*